United States Patent
Tanaka et al.

(10) Patent No.: US 10,456,737 B2
(45) Date of Patent: Oct. 29, 2019

(54) ABSORBING LIQUID, METHOD FOR PREPARING ABSORBING LIQUID, AND DEVICE AND METHOD FOR REMOVING CO2 OR H2S OR BOTH

(71) Applicant: MITSUBISHI HEAVY INDUSTRIES, LTD., Tokyo (JP)

(72) Inventors: Hiroshi Tanaka, Tokyo (JP); Takuya Hirata, Tokyo (JP); Atsuhiro Yukumoto, Tokyo (JP); Tsuyoshi Oishi, Tokyo (JP); Takahiko Endo, Tokyo (JP); Tatsuya Tsujiuchi, Tokyo (JP)

(73) Assignees: MITSUBISHI HEAVY INDUSTRIES ENGINEERING, LTD., Kanagawa (JP); THE KANSAI ELECTRIC POWER CO., INC., Osaka (JP)

( * ) Notice: Subject to any disclaimer, the term of this patent is extended or adjusted under 35 U.S.C. 154(b) by 0 days.

(21) Appl. No.: 15/522,432

(22) PCT Filed: Oct. 23, 2015

(86) PCT No.: PCT/JP2015/079936
§ 371 (c)(1),
(2) Date: Apr. 27, 2017

(87) PCT Pub. No.: WO2016/121176
PCT Pub. Date: Aug. 4, 2016

(65) Prior Publication Data
US 2017/0326495 A1 Nov. 16, 2017

(30) Foreign Application Priority Data
Jan. 26, 2015 (JP) .................................. 2015-012480

(51) Int. Cl.
*B01D 53/62* (2006.01)
*B01D 53/14* (2006.01)
(Continued)

(52) U.S. Cl.
CPC ..... *B01D 53/1493* (2013.01); *B01D 53/1462* (2013.01); *B01D 53/1468* (2013.01);
(Continued)

(58) Field of Classification Search
None
See application file for complete search history.

(56) References Cited

U.S. PATENT DOCUMENTS 3,535,260 A 10/1970 Singh
4,840,777 A 6/1989 Faucher
(Continued)

FOREIGN PATENT DOCUMENTS

EP 2168658 A1 3/2010
JP 3-252430 A 10/1996
(Continued)

OTHER PUBLICATIONS

Derks P.W.J. et al., "Experimental and theoretical study of the solubility of carbon dioxide in aqueous blends of piperazine and N-methyldiethanolamine", Journal of Chemical Thermodynamics, Academic Press, London, GB, Jan. 1, 2010, vol. 42, No. 1, pp. 151-163.
(Continued)

*Primary Examiner* — Daniel Berns
(74) *Attorney, Agent, or Firm* — Westerman, Hattori, Daniels & Adrian, LLP

(57) ABSTRACT

An absorbing liquid which absorbs the $CO_2$ or $H_2S$ or both contained in a gas, and which comprises 1) at least one tertiary-monoamine main agent selected from a tertiary-monoamine group and 2) at least one secondary-diamine (Continued)

first additive selected from a secondary-diamine group, the secondary-diamine concentration being within the range of 0.05 to 0.5 in terms of the additive concentration index represented by the following expression (I). (Additive concentration index)=[(secondary-diamine acid dissociation index) (pKa)/(tertiary-monoamine acid dissociation index) (pKa)] (index ratio)×[(secondary-diamine molar concentration) (mol/L)/(tertiary-monoamine molar concentration) (mol/L)] (molar ratio) (I).

2 Claims, 5 Drawing Sheets

(51) Int. Cl.
    *C01B 32/50*     (2017.01)
    *B01D 53/52*     (2006.01)
    *B01D 53/96*     (2006.01)

(52) U.S. Cl.
    CPC ......... *B01D 53/1475* (2013.01); *B01D 53/52* (2013.01); *B01D 53/62* (2013.01); *B01D 53/96* (2013.01); *C01B 32/50* (2017.08); *B01D 2252/2041* (2013.01); *B01D 2252/20431* (2013.01); *B01D 2252/20447* (2013.01); *B01D 2252/20484* (2013.01); *B01D 2252/504* (2013.01); *Y02C 10/04* (2013.01); *Y02C 10/06* (2013.01)

(56) References Cited

U.S. PATENT DOCUMENTS

| | | | |
|---|---|---|---|
| 5,618,506 | A | 4/1997 | Suzuki et al. |
| 6,423,282 | B1 | 7/2002 | Araki et al. |
| 2006/0162559 | A1 | 7/2006 | Asprion et al. |
| 2007/0077188 | A1 | 4/2007 | Katz et al. |
| 2008/0025893 | A1 | 1/2008 | Asprion et al. |
| 2008/0078292 | A1 | 4/2008 | Mimura et al. |
| 2010/0126348 | A1 | 5/2010 | Shimizu et al. |
| 2011/0283885 | A1 | 11/2011 | Thiele et al. |
| 2012/0308451 | A1 | 12/2012 | Murai et al. |
| 2014/0127119 | A1 | 5/2014 | Fujimoto et al. |

FOREIGN PATENT DOCUMENTS

| | | |
|---|---|---|
| JP | 2005-523800 A | 8/2005 |
| JP | 2007-527790 A | 10/2007 |
| JP | 2012-183537 A | 9/2012 |
| JP | 2012-245483 A | 12/2012 |
| WO | 99/51326 A1 | 10/1999 |
| WO | 2006/107026 A1 | 10/2006 |
| WO | 2009/001804 A1 | 12/2008 |
| WO | 2012/169634 A1 | 12/2012 |

OTHER PUBLICATIONS

Jin Mei et al., "Absorption of CO2 from Flue Gas Using Mixed Amine Solution", Advanced Materials Research, Sep. 30, 2013, vol. 781-784, pp. 2201-2204.

Kohl A. L. et al., "Gas Purification Flow Systems", Gas Purification, Gulf Publishing Company, Jan. 1, 1997, pp. 57-59.

Search Report dated Oct. 4, 2017, issued in counterpart European Application No. 15880069.8 (12 pages).

Translation of Written Opinion dated Jan. 26, 2016, issued in counterpart Application No. PCT/JP2015/079936 (12 pages).

International Search Report dated Jan. 26, 2016, issued in counterpart International Application No. PCT/JP2015/079936 (2 pages).

Written Opinion of the International Search Authority dated Jan. 26, 2016, issued in counterpart International Application No. PCT/JP2015/079936 (4 pages).

ABSORBING LIQUID, METHOD FOR PREPARING ABSORBING LIQUID, AND DEVICE AND METHOD FOR REMOVING CO2 OR H2S OR BOTH

TECHNICAL FIELD

The present invention relates to an absorbing liquid for removing carbon dioxide ($CO_2$) or hydrogen sulfide ($H_2S$) or both contained in a gas, a method for preparing an absorbing liquid, and a device and method for removing $CO_2$ or $H_2S$ or both by using an absorbing liquid.

BACKGROUND ART

Conventionally, a method for recovering and removing acid gases, in particular, $CO_2$, which are contained in gases (gases to be treated) such as various industrial gases produced in chemical plants, such as a natural gas and a synthesis gas, and flue gases, has been studied and various methods have been proposed.

For example, for the flue gases, a method for allowing $CO_2$ in a flue gas to come into contact with an alkanolamine solution or the like to remove and recover $CO_2$, and a method for storing recovered $CO_2$ without discharging $CO_2$ to the atmosphere have been actively studied.

Examples of the alkanolamine that can be used include monoethanolamine (MEA), diethanolamine (DEA), triethanolamine (TEA), 2-amino-2-methyl-1-propanol (AMP), diisopropanolamine, 2-methylaminoethanol, 2-ethylaminoethanol, 2-propylaminoethanol, n-butylaminoethanol, 2-(isopropylamino)ethanol, and 3-ethylaminopropanol.

For example, an absorbing liquid formed of a mixture of secondary amine or a mixture of secondary amine and tertiary amine is disclosed in a United States patent specification. It is proposed that this mixed absorbing liquid is an advantageous absorbing liquid because an absorbing ability and regeneration energy are significantly improved in the mixed absorbing liquid compared with an MEA single absorbing liquid (PTL 1).

In the case in which a monoethanolamine (MEA) absorbing liquid is used, there is a problem in that degradation in the absorbing liquid severely progresses because of oxygen or the like in a gas.

Therefore, conventionally, a method has been proposed for stabilizing an absorbing liquid by adding, for example, trialkanolamine or methyldiethanolamine (MDEA) to the absorbing liquid (PTL 2 and PTL 3).

CITATION LIST

Patent Literature

[PTL 1] U.S. Pat. No. 5,618,506
[PTL 2] U.S. Pat. No. 3,535,260
[PTL 3] U.S. Pat. No. 4,840,777

SUMMARY OF INVENTION

Technical Problem

However, in the above PTLs, demonstrations for the absorbing ability and the like for the absorbing liquid formed of a mixture of secondary amine and tertiary amine are disclosed. However, when an absorbing liquid to be used in a closed system is regenerated in an absorbing liquid regeneration tower, from the viewpoint of regeneration energy, a method for obtaining the mixing ratio thereof is not disclosed. It is earnestly desired to provide a technique of reducing a so-called reboiler heat duty when the absorbing liquid is regenerated and used.

The present invention is made in consideration of the above problems and an object thereof is to provide an absorbing liquid capable of reducing a so-called reboiler heat duty when the absorbing liquid is regenerated and used, a method for preparing an absorbing liquid, and a device and a method for removing $CO_2$ or $H_2S$ or both.

Solution to Problem

In order to solve the above problems, according to a first aspect of the present invention, there is provided an absorbing liquid which absorbs $CO_2$ or $H_2S$ or both contained in a gas, the absorbing liquid including: 1) at least one tertiary-monoamine main agent selected from a tertiary-monoamine group; and 2) at least one secondary-diamine first-additive selected from a secondary-diamine group, in which a secondary-diamine concentration is within the range of 0.05 to 0.5 in terms of an additive concentration index represented by Expression (I).

Additive concentration index=[secondary-diamine acid dissociation index (pKa)/tertiary-monoamine acid dissociation index (pKa)]index ratio×[secondary-diamine molar concentration (mol/L)/tertiary-monoamine molar concentration (mol/L)]molar ratio (I)

According to a second aspect of the present invention, in the absorbing liquid according to the first aspect, a total sum of the tertiary monoamine and the secondary diamine is 10% to 70% by weight with respect to the total absorbing liquid.

According to a third aspect of the present invention, the absorbing liquid according to the first aspect further includes at least one secondary-monoamine secondary additive selected from a secondary-monoamine group.

According to a fourth aspect of the present invention, in the absorbing liquid according to the second or third aspect, a total sum of the tertiary monoamine, the secondary diamine and the secondary monoamine is 10% to 70% by weight with respect to the total absorbing liquid.

According to a fifth aspect of the present invention, in the absorbing liquid according to the third aspect, the weight ratio of the secondary monoamine is within a range of 0.05 to 0.6 with respect to the total sum of the tertiary monoamine and the secondary diamine (% by weight).

According to a sixth aspect of the present invention, in the absorbing liquid according to the first aspect, the tertiary monoamine is a compound represented by the following Chemical Formula (1):

in the formula, $R_1$ represents a hydrocarbon group having 1 to 4 carbon atoms, $R_2$ represents a hydrocarbon group or a hydroxyalkyl group having 1 to 4 carbon atoms, and $R_3$ represents a hydrocarbon group or a hydroxyalkyl group having 1 to 4 carbon atoms.

According to a seventh aspect of the present invention, in the absorbing liquid according to the third aspect, the secondary monoamine is a compound represented by the following Chemical Formula (2):

(2)

in the formula, $R_4$ represents a hydrocarbon group having 1 to 4 carbon atoms, and $R_5$ represents a hydroxyalkyl group having 1 to 4 carbon atoms.

According to an eighth aspect of the present invention, there is provided a method for preparing an absorbing liquid which absorbs $CO_2$ or $H_2S$ or both contained in a gas, the method including: a tertiary-monoamine concentration specifying process of specifying a tertiary-monoamine concentration to a predetermined concentration (preferably within a range of 1 to 5.5 mol/L) using 1) at least one tertiary-monoamine main agent selected from a tertiary-monoamine group and 2) at least one secondary-diamine first additive selected from a secondary-diamine group; and a secondary diamine concentration determining process of determining a secondary-diamine concentration in the specified tertiary-monoamine concentration to be within a range of 0.05 to 0.5 in terms of an additive concentration index represented by Expression (I).

Additive concentration index=[secondary-diamine acid dissociation index (pKa)/tertiary-monoamine acid dissociation index (pKa)]index ratio× ([secondary-diamine molar concentration (mol/L)/tertiary-monoamine molar concentration (mol/L)]molar ratio  (I)

According to a ninth aspect of the present invention, in the method for preparing an absorbing liquid according to the eighth aspect, a total sum of the tertiary monoamine and the secondary diamine is 10% to 70% by weight with respect to the total absorbing liquid.

According to a tenth aspect of the present invention, in the method for preparing an absorbing liquid according to the eighth aspect, the absorbing liquid further contains at least one secondary-monoamine secondary additive selected from a secondary-monoamine group.

According to an eleventh aspect of the present invention, in the method for preparing an absorbing liquid according to the eighth or ninth aspect, a total sum of the tertiary monoamine, the secondary diamine and the secondary monoamine is 10% to 70% by weight with respect to the total absorbing liquid.

According to a twelfth aspect of the present invention, in the method for preparing an absorbing liquid according to the tenth aspect, the weight ratio of the secondary monoamine is within a range of 0.05 to 0.6 with respect to the total sum of the tertiary monoamine and the secondary diamine (% by weight).

According to an thirteenth aspect of the present invention, in the method for preparing an absorbing liquid according to the eighth aspect, the tertiary monoamine is a compound represented by the following Chemical Formula (1):

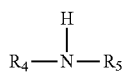

(1)

in the formula, $R_1$ represents a hydrocarbon group having 1 to 4 carbon atoms, $R_2$ represents a hydrocarbon group or a hydroxyalkyl group having 1 to 4 carbon atoms, and $R_3$ represents a hydrocarbon group or a hydroxyalkyl group having 1 to 4 carbon atoms.

According to a fourteenth aspect of the present invention, in the method for preparing an absorbing liquid according to the tenth aspect, the secondary monoamine is a compound represented by the following Chemical Formula (2).

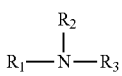

(2)

in the formula, $R_4$ represents a hydrocarbon group having 1 to 4 carbon atoms, and $R_5$ represents a hydroxyalkyl group having 1 to 4 carbon atoms.

According to a fifteenth aspect of the present invention, there is provided a device for removing $CO_2$ or $H_2S$ or both including: an absorption tower which allows a gas containing $CO_2$ or $H_2S$ or both to come in contact with an absorbing liquid to remove $CO_2$ or $H_2S$ or both; and a regeneration tower which regenerates a solution that absorbs $CO_2$ or $H_2S$ or both, in which a solution regenerated by removing $CO_2$ or $H_2S$ or both in the regeneration tower is reused in the absorption tower, and the absorbing liquid according to any one of the first to seventh aspects is used.

According to a sixteenth aspect of the present invention, there is provided a method for removing $CO_2$ or $H_2S$ or both including: allowing a gas containing $CO_2$ or $H_2S$ or both to come in contact with an absorbing liquid in an absorption tower to remove $CO_2$ or $H_2S$ or both; regenerating a solution that absorbs $CO_2$ or $H_2S$ or both in a regeneration tower; and reusing the solution regenerated in the regeneration tower by removing $CO_2$ or $H_2S$ or both in the absorption tower, in which the absorbing liquid according to any one of the first to seventh aspects is used to remove $CO_2$ or $H_2S$ or both.

Advantageous Effects of Invention

According to the present invention, it is possible to determine a suitable concentration range of a secondary diamine of a first additive with respect to each concentration of tertiary monoamine of a main-ingredient amine compound by using an additive concentration index represented by Expression (I). As a result, an absorbing liquid for reducing the reboiler heat duty of an absorbing liquid regeneration tower as a $CO_2$ recovery energy consumption (about 10% reduced compared to the conventional one) is easily selected.

DESCRIPTION OF EMBODIMENTS

Figure 1:
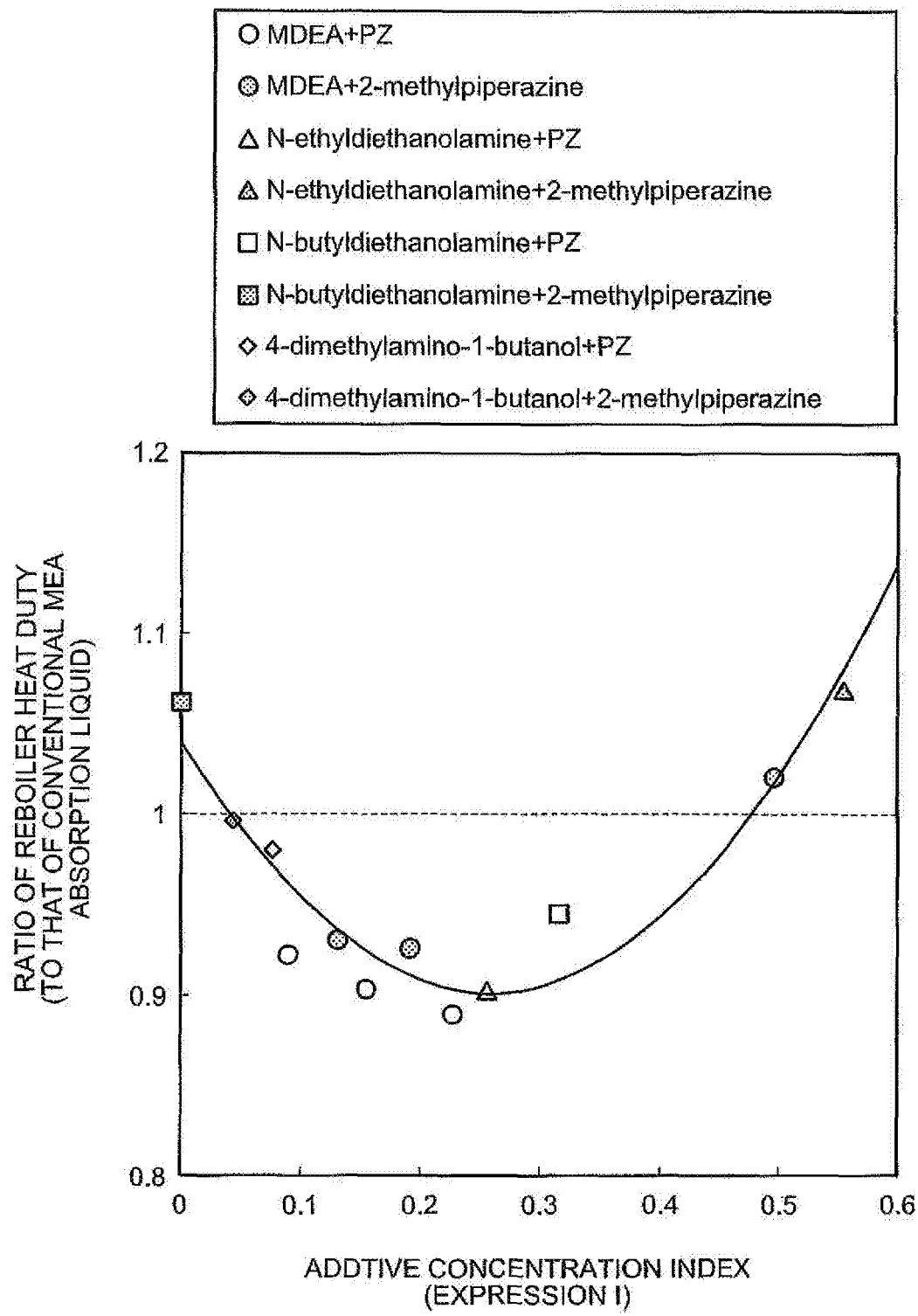
FIG. 1 is a diagram showing a relationship between an additive concentration index and a reboiler heat duty ratio.

Hereinafter, the present invention will be described in detail below with reference to the drawings. The present invention is not limited to these embodiments and examples. Constitutional components in the embodiments and the examples include components that those skilled in the art can easily anticipate, or include components that are substantially identical with the constitutional components that those skilled in the art can easily anticipate.

Embodiment of the Invention

An absorbing liquid according to an embodiment is an absorbing liquid which absorbs $CO_2$ or $H_2S$ or both in a gas, and contains 1) at least one tertiary-monoamine main agent selected from a tertiary-monoamine group, and 2) at least one secondary-diamine first additive selected from a secondary-diamine group, and the secondary-diamine concentration is within a range of 0.05 to 0.5 in terms of the additive concentration index represented by the following expression (I).

Additive concentration index=[secondary-diamine acid dissociation index (pKa)/tertiary-monoamine acid dissociation index (pKa)]index ratio× ([secondary-diamine molar concentration (mol/L)/tertiary-monoamine molar concentration (mol/L)]molar ratio (I)

Here, the acid dissociation index is an index for quantitatively determining the strength of acid and is also referred to as an acid dissociation constant or an acidity constant. Considering a dissociation reaction in which hydrogen ions are discharged from acid, the acid dissociation index is expressed by an equilibrium constant "Ka" thereof or a negative common logarithm "pKa" thereof.

The acid dissociation index is a numerical value peculiar to a substance. For example, the acid dissociation index of piperazine of a secondary diamine is 9.9 (in a case of measuring the acid dissociation index at 20° C. using water as a solvent). In addition, the acid dissociation index of N-methyldiethanolamine (MDEA) of a tertiary monoamine is 8.8 (in a case of measuring the acid dissociation index at 20° C. using water as a solvent).

Next, the additive concentration index of Expression (I) will be described in more detail.

Here, the additive concentration index is defined as the product of an index ratio between the acid dissociation index of the secondary diamine and the acid dissociation index of the tertiary monoamine, and a molar ratio between the molar concentration of the secondary diamine and the molar concentration of the tertiary monoamine as shown in Expression (I).

Here, in Expression (I),
the additive concentration index is expressed as "α",
the index ratio of "secondary-diamine acid dissociation index (pKa)"/"tertiary-monoamine acid dissociation index (pKa)" is expressed as "β",
the secondary-diamine molar concentration is expressed as "x" (mol/L), and
the tertiary-monoamine molar concentration is expressed as "y" (mol/L).

When these are applied to Expression (I), the following equation (II) is established.

Additive concentration index $(\alpha)=\beta \times (x/y)$ (II)

Here, FIG. 1 is a diagram showing a relationship between an additive concentration index and a reboiler heat duty ratio. In FIG. 1, the reboiler heat duty of monoethanolamine (MEA) of a conventional absorbing liquid is set to 1 as a reference.

In FIG. 1, a relationship between the additive concentration index and the reboiler heat duty ratio is shown in the case in which a tertiary monoamine is used as a main agent and a secondary diamine is used as a first additive for an absorbing liquid. Here, for the conditions for an absorption tower, $CO_2$ in an flue gas is absorbed by an absorbing liquid at 40° C. and $CO_2$ is discharged in an absorbing liquid regeneration tower at 120° C. The partial pressure of $CO_2$ in the flue gas is set to 0.1 atm.

As shown in FIG. 1, the additive concentration index (α) suitable for reducing a reboiler heat duty is within a range of 0.05 to 0.5, preferably 0.1 to 0.45, more preferably 0.15 to 0.4, and even more preferably 0.2 to 0.35.

Accordingly, based on the suitable range of the additive concentration index (α), the range of the secondary-diamine additive concentration preferable for reducing a reboiler heat duty in each concentration of tertiary monoamine is determined from the relationship between a ratio between secondary-diamine molar concentration and tertiary-monoamine molar concentration (x/y)=additive concentration index (α)/index ratio (β) between secondary-diamine acid dissociation index and tertiary-monoamine acid dissociation index as shown by the following Expression (III).

Molar ratio of (secondary-diamine molar concentration/tertiary-monoamine molar concentration)(x/y)=additive concentration index (α)/index ratio (β) of (secondary-diamine acid dissociation index/tertiary-monoamine acid dissociation index) (III)

Accordingly, regarding the index ratio (β) of (secondary-diamine acid dissociation index/tertiary-monoamine acid dissociation index), since an acid dissociation index is a physical property value peculiar to a compound, by selecting each amine compound, an additive index range suitable for reducing a reboiler heat duty, and a molar concentration range of the selected secondary diamine, suitable for reducing a reboiler heat duty, in each concentration of tertiary monoamine selected from Expression (III), are determined.

Here, the additive concentration index (α) is specified as, for example, "0.3", which corresponds to the bottom part of the curve in FIG. 1, and the "y" of the tertiary-monoamine molar concentration is specified as, "3 mol/L". β is a ratio between intrinsic constants of the acid dissociation indices and is separately obtained.

When these are applied to Expression (I), (x/y=3)= (α=0.3)/β is obtained and when x is developed, the following Expression (IV) is established.

$x$=[additive concentration index (α=0.3)×(y=3)]/β (IV)

As a result, in the case in which the concentration of the tertiary-monoamine main agent is specified as, for example, y=3 mol, a suitable range of the secondary-diamine concentration which contributes to reducing a reboiler heat duty is obtained within the range of the additive concentration index (α=0.05 to 0.5).

Specifically, the case in which the tertiary monoamine is N-methyldiethanolamine (MDEA) and the secondary diamine is piperazine (PZ) will be described.

First, the acid dissociation index (pKa) of N-methyldiethanolamine (MDEA) is 8.8, and the acid dissociation index (pKa) of piperazine is 9.9 (which are measured at 20° C. using water as a solvent).

Accordingly, the index ratio "β" of piperazine acid dissociation index (pKa=9.9)/MDEA acid dissociation index (pKa=8.8) is 1.1.

When this index ratio is applied to the case in which additive concentration index (α) is within a range of 0.05 to 0.5, and the molar concentration (y) of N-methyldiethanolamine (MDEA) of the main agent is 3 mol/L, x (molar concentration) is obtained as follows.

When α is 0.05, x is 0.14, when α is 0.1, x is 0.27, and when α is 0.2, x is 0.55. When α is 0.3, x is 0.82, when α is 0.4, x is 1.1, and when α is 0.5, x is 1.36.

Particularly, it is suitable to reduce a reboiler heat duty near the bottom part of the relation curve in FIG. 1 (α=0.3). Since the value of x at this time is 0.82, it is preferable that the concentration of the secondary diamine (piperazine) is 0.82 mol/L.

Figure 2:
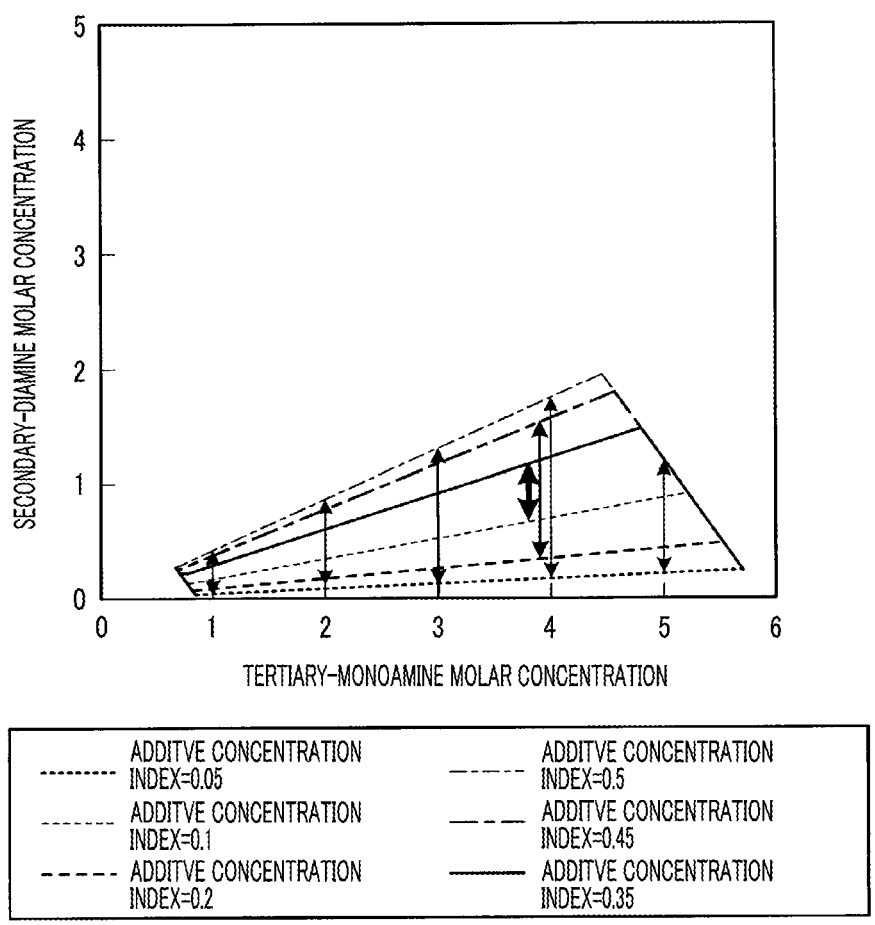
FIG. 2 is a diagram showing a relationship between a tertiary-monoamine molar concentration and a secondary-diamine molar concentration in an additive concentration index.

FIG. 2 is a diagram showing a relationship between a tertiary-monoamine molar concentration and a secondary-diamine molar concentration in the additive concentration index. In FIG. 2, the uppermost dashed line indicates a case in which the additive concentration index (α) is 0.5, the lowermost broken line indicates a case in which the additive concentration index (α) is 0.05, and each line indicates cases in which the additive concentration indices (α) are 0.45, 0.35, 0.2, and 0.1, respectively. When the tertiary-monoamine molar concentration is specified, within a range between both vertical axes of the specified molar concentration, a suitable secondary-diamine molar concentration is obtained.

In this manner, while in the related art, the concentrations of a tertiary monoamine which is a main agent, and a secondary diamine which is a first additive are separately obtained, by using the additive concentration index (α) represented by Expression (I), a suitable concentration range of a secondary diamine with respect to each concentration of tertiary monoamine can be specified. As a result, as shown in the above-described embodiment, an absorbing liquid for reducing the reboiler heat duty of an absorbing liquid regeneration tower as a $CO_2$ recovery energy consumption (about 10% reduced compared to the conventional one) is easily selected.

In addition, the method for preparing an absorbing liquid of the present invention is a method for preparing an absorbing liquid which absorbs $CO_2$ or $H_2S$ or both in a gas, and includes a tertiary-monoamine concentration specifying process of specifying a tertiary-monoamine concentration to a predetermined concentration (preferably within a range of 1 to 5.5 mole/L) using 1) at least one tertiary-monoamine main agent selected from a tertiary-monoamine group and 2) at least one secondary-diamine first additive selected from a secondary-diamine group, and a secondary-diamine concentration determining process of determining the secondary-diamine concentration in the specified tertiary-monoamine concentration to be within a range of 0.05 to 0.5 in terms of the additive concentration index represented by Expression (I).

Additive concentration index=[secondary-diamine acid dissociation index (pKa)/tertiary-monoamine acid dissociation index (pKa)]index ratio×([secondary-diamine molar concentration (mol/L)/tertiary-monoamine molar concentration (mol/L)]molar ratio  (I)

In the related art, since the concentrations of a tertiary monoamine which is a main agent, and a secondary diamine which is a first additive are separately determined, in order to reduce a reboiler heat duty, a process of trial and error is repeated to determine formulation. In contrast, by performing the method for preparing an absorbing liquid, a suitable concentration range of the secondary diamine of the first additive with respect to each concentration of tertiary monoamine of the main-ingredient amine compound can be specified by using the additive concentration index (α) represented by Expression (I). As a result, as shown in the above-described embodiment, an absorbing liquid for reducing a reboiler heat duty of an absorbing liquid regeneration tower as a $CO_2$ recovery energy consumption (about 10% reduced compared to the conventional one) is easily selected.

Here, the total sum of the tertiary monoamine and the secondary diamine is preferably 10% to 70% by weight with respect to the total absorbing liquid.

This is because, since in the case in which the amine concentration is as low as less than 10% by weight, the absorbing liquid is mainly composed of water and thus the $CO_2$ absorption effect by the amine absorbent is weak to increase the flow rate of the absorbing liquid, and in the case in which the amine concentration is as high as more than 70% by weight, the flow rate of the absorbing liquid increases due to regeneration performance degradation or the like, energy saving properties are deteriorated in both cases.

Here, it is preferable that the tertiary monoamine is a compound represented by the following Chemical Formula (1).

Here, $R_1$ represents a hydrocarbon group having 1 to 4 carbon atoms, $R_2$ represents a hydrocarbon group or a hydroxyalkyl group having 1 to 4 carbon atoms, and $R_3$ represents a hydrocarbon group or a hydroxyalkyl group having 1 to 4 carbon atoms.

Specific examples of the tertiary monoamine include N-methyldiethanolamine, N-ethyldiethanolamine, N-butyldiethanolamine, 4-dimethylamino-1-butanol, 2-dimethylaminoethanol, 2-diethylaminoethanol, 2-di-n-butylaminoethanol, N-ethyl-N-methylethanolamine, 3-dimethylamino-1-propanol, and 2-dimethylamino-2-methyl-1-propanol, and the present invention is not limited thereto.

Examples of the secondary diamine include a compound selected from at least one kind of piperazine derivatives, 2-methylpiperazine, 2,3-dimethylpiperazine, 2,5-dimethylpiperazine, N,N'-dimethylethanediamine, N,N'-dimethylpropanediamine, N,N'-diethylethylenediamine, N,N'-diethylpropanediamine, N,N'-diisopropylethylenediamine, and N,N'-ditertiarybutylethanediamine, and the present invention is not limited thereto.

Among these, a piperazine derivative is preferable.

Specific examples of the piperazine derivative include a compound selected from at least one kind of piperazine, 2-methylpiperazine, and 2,5-dimethylpiperazin, and the present invention is not limited thereto.

In addition, the absorbing liquid of the present invention is not limited to a two-component composite amine absorbing liquid including a main agent and an additive and may be a three-component composite amine absorbing liquid including a first additive and a second additive as additives.

Specifically, as the second additive component to be added to the two-component absorbent, a secondary monoamine can be used.

Figure 3:
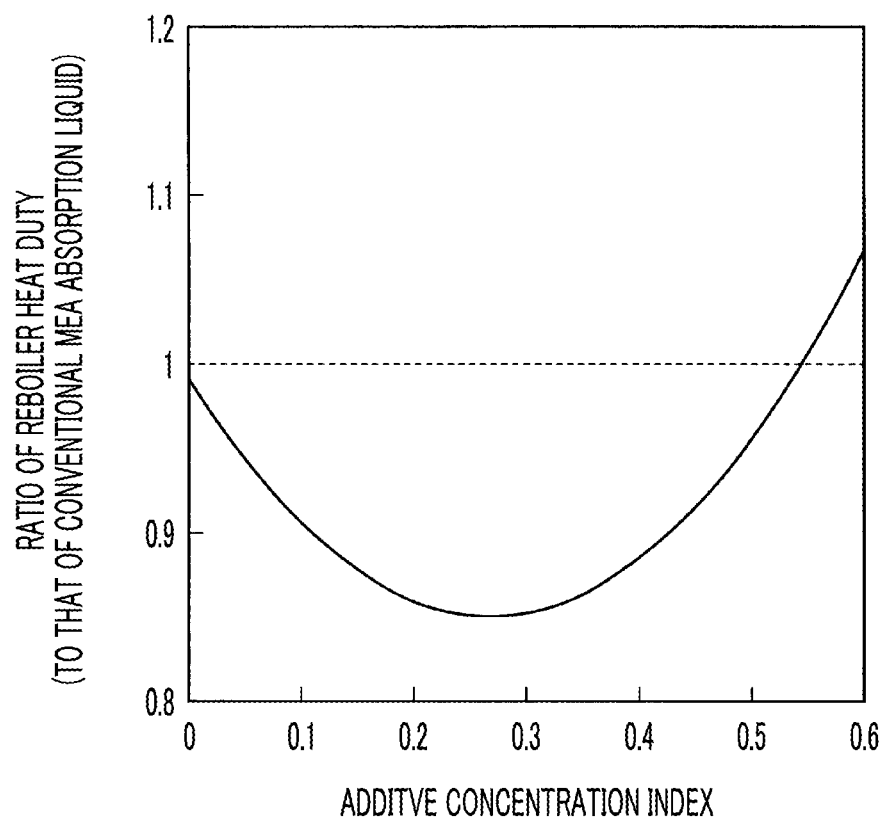
FIG. 3 is a diagram showing a relationship between a three-component additive concentration index and a reboiler heat duty ratio.

FIG. 3 is a diagram showing a relationship between a three-component additive concentration index and a reboiler heat duty ratio. Here, in FIG. 3, the reboiler heat duty of monoethanolamine (MEA) of a conventional absorbing liquid is set to 1 as a reference.

In FIG. 3, in the case in which a tertiary monoamine is used as a main agent, a secondary diamine is used as a first additive, and a secondary monoamine is used as a second additive for the absorbing liquid, the relationship between the additive concentration index and the reboiler heat duty ratio is shown. Here, for the conditions for an absorption tower, $CO_2$ in an flue gas is absorbed by an absorbing liquid at 40° C. and $CO_2$ is discharged in an absorbing liquid regeneration tower at 120° C. The partial pressure of $CO_2$ in the flue gas is set to 0.1 atm.

As shown in FIG. 3, the additive concentration index ($\alpha$) suitable for reducing a reboiler heat duty is within a range of 0.05 to 0.5, preferably 0.1 to 0.45, and more preferably 0.15 to 0.4.

Here, the secondary monoamine is preferably a compound represented by the following Chemical Formula (2)

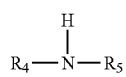

(2)

Here, $R_4$ represents a hydrocarbon group having 1 to 4 carbon atoms, and $R_5$ represents a hydroxyalkyl group having 1 to 4 carbon atoms.

Specific examples of the secondary monoamine include a compound selected from at least one kind of 2-methylaminoethanol, 2-ethylaminoethanol, 2-n-propylaminoethanol, 2-n-butylaminoethanol, 2-n-pentylaminoethanol, 2-isopropylaminoethanol, 2-sec-butylaminoethanol, and 2-isobutylaminoethanol, and the present invention is not limited thereto.

Here, the total sum of the tertiary monoamine, the secondary diamine and the secondary monoamine is preferably 10% to 70% by weight with respect to the total absorbing liquid.

This is because, since in the case in which the amine concentration is as low as less than 10% by weight, the absorbing liquid is mainly composed of water and thus the CO2 absorption effect by the amine absorbent is weak to increase the flow rate of the absorbing liquid, and in the case in which the amine concentration is as high as more than 70% by weight, the flow rate of the absorbing liquid increases due to regeneration performance degradation or the like, energy saving properties are deteriorated in both cases.

Figure 4:
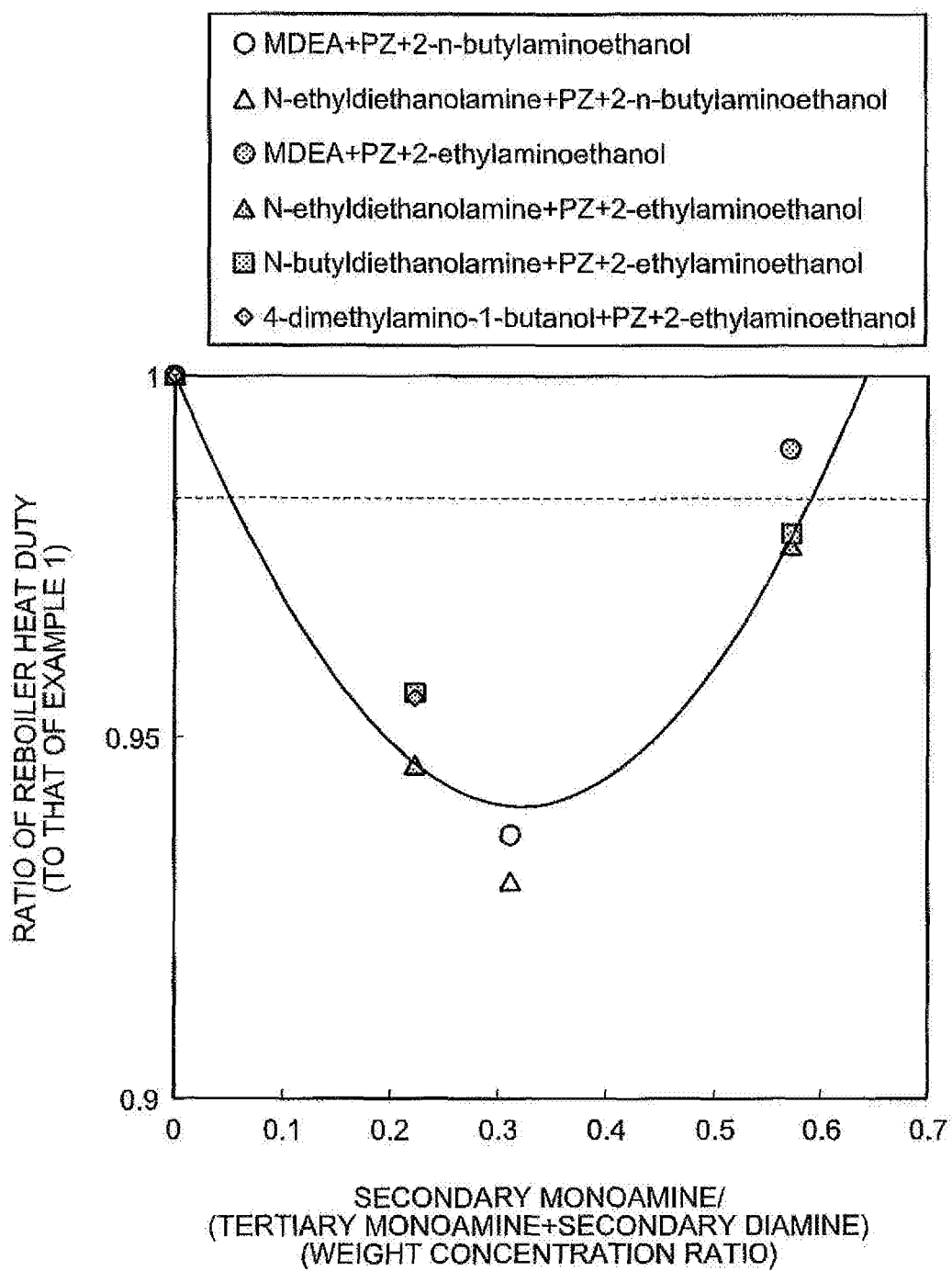
FIG. 4 is a diagram showing a relationship between secondary monoamine/(tertiary monoamine+secondary diamine) (weight concentration ratio) and a reboiler heat duty ratio in the case in which a two-component base is set to a reference (1) shown in FIG. 1.

FIG. 4 is a diagram showing a relationship between secondary monoamine/(tertiary monoamine+secondary diamine) (weight concentration ratio) and a reboiler heat duty ratio in the case in which a two-component base is set to a reference (1) shown in FIG. 1.

As shown in FIG. 4, the value of secondary monoamine/ (tertiary monoamine+secondary diamine) (weight concentration ratio) is within a range of 0.05 to 0.6, preferably 0.1 to 0.5, and more preferably 0.15 to 0.45.

As a result, the weight ratio of the secondary monoamine is preferably within a range of 0.05 to 0.6 with respect to the total sum of the tertiary monoamine and the secondary diamine (% by weight).

In the case of adding the secondary monoamine, similar to the two-component absorbing liquid, first, the molar concentration of the tertiary monoamine as the main-ingredient compound is specified and then a secondary-diamine molar concentration which contributes to reducing a reboiler heat duty is determined by using the additive concentration index ($\alpha$). Then, the weight ratio of the secondary monoamine is determined such that the amount to be added is within a range of 0.05 to 0.6 with respect to the total sum of the tertiary monoamine and the secondary diamine (% by weight).

In the related art, various molar concentrations for a three-component absorbing liquid are selected and a process of trial and error is repeated to determine formulation. In contrast, by using the additive concentration index ($\alpha$) represented by expression (I), a suitable concentration of the secondary diamine as the first additive with respect to each concentration of tertiary monoamine of the main-ingredient amine compound can be specified and further a suitable addition range of the second monoamine of the secondary additive can be specified. As a result, an absorbing liquid for reducing the reboiler heat duty of an absorbing liquid regeneration tower as a co2 recovery energy consumption is easily selected.

For the absorbing liquid of the present invention, a process that can be adopted in the method for removing $CO_2$ or $H_2S$ or both in a flue gas is not particularly limited and an example thereof will be described with reference to FIG. 5. In the example, $CO_2$ in a flue gas is exemplified as an object to be removed.

Figure 5:
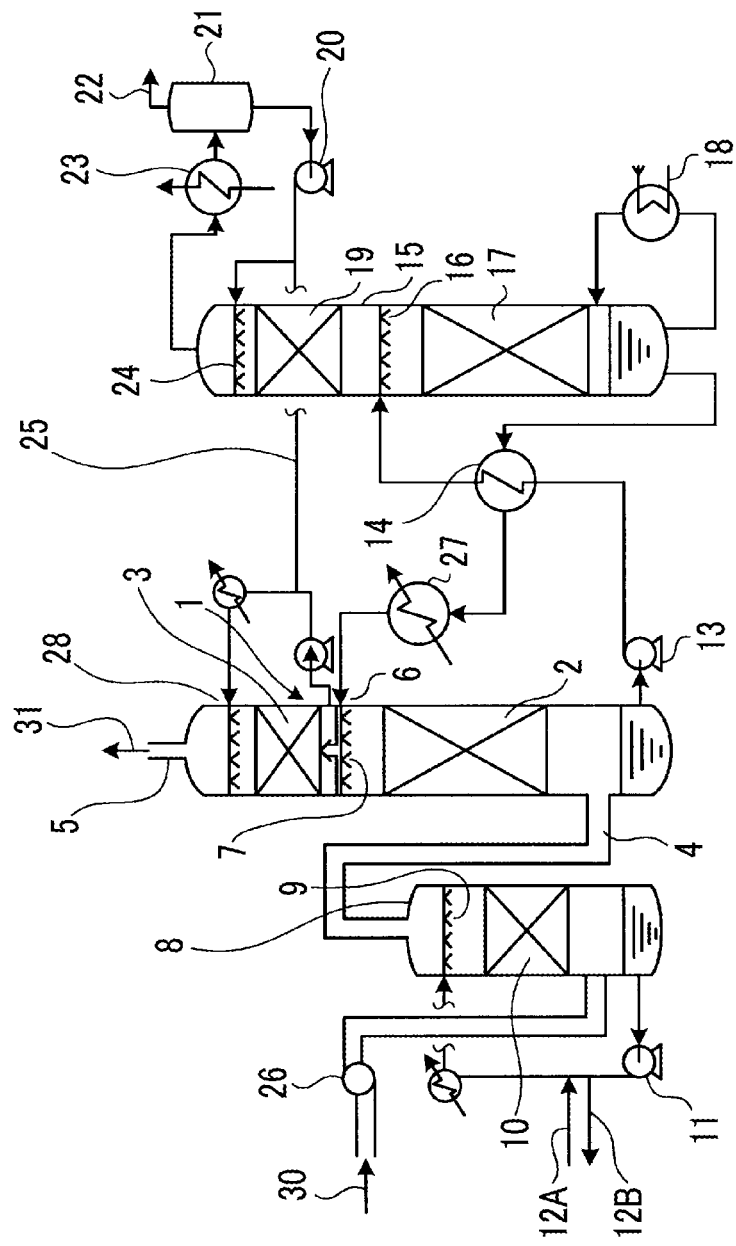
FIG. 5 is a diagram for explaining an example of a process that can be adopted in the present invention.

FIG. 5 shows only main equipment and additional equipment is not shown. In FIG. 5, the reference numeral 1 denotes a $CO_2$ absorption tower, the reference numeral 2 denotes a lower packed bed, the reference numeral 3 denotes an upper packed bed or a tray, the reference numeral 4 denotes a flue gas inlet of the $CO_2$ absorption tower 1, the reference numeral 5 denotes a decarbonated flue gas outlet, the reference numeral 6 denotes an absorbing liquid inlet, the reference numeral 7 denotes liquid dispersers, the reference numeral 8 denotes a flue gas cooler provided as required, the reference numeral 9 denotes liquid dispersers, the reference numeral 10 denotes a packed bed, the reference numeral 11 denotes a coolant circulation pump, the reference numeral 12A denotes a makeup-water supply line, the reference numeral 12B denotes a wastewater discharge line, the reference numeral 13 denotes an absorbing liquid discharge pump for an absorbing liquid in which $CO_2$ is absorbed, the reference numeral 14 denotes a heat exchanger, the reference numeral 15 denotes an absorbing liquid regeneration tower, the reference numeral 16 denotes liquid dispersers, the reference numeral 17 denotes a lower packed bed, the reference numeral 18 denotes a reboiler, the reference numeral 19 denotes an upper packed bed, the reference numeral 20 denotes a reflux-water pump, the reference numeral 21 denotes a $CO_2$ separator, the reference numeral 22 denotes a recovered $CO_2$ exhaust line, the reference numeral 23 denotes a regeneration tower reflex cooler, the reference numeral 24 denotes liquid dispersers, the reference numeral 25 denotes a regeneration tower reflux-water supply line, the reference numeral 26 denotes a flue gas supply blower, the reference numeral 27 denotes a cooler, the reference numeral 28 denotes a regeneration tower reflux-water inlet, and the reference numeral 30 denotes a flue gas.

In FIG. 5, the flue gas 30 is squeezed into the flue gas cooler 8 by the flue gas blower 26, comes into contact with a coolant from the liquid dispersers 9 in the packed bed 10, cooled, and led to the $CO_2$ absorption tower 1 through the flue gas inlet 4 of the $CO_2$ absorption tower 1. The coolant coming into contact with the flue gas 30 accumulates in a lower part of the flue gas cooler 8, is circulated to the liquid dispersers 9 by the coolant circulation pump 11 and used. Here, in the case in which the amount of moisture in the flue gas 30 is small, since the coolant is gradually lost by humidifying and cooling the flue gas, the coolant is filled by the makeup-water supply line 12A. In the case in which the amount of moisture in the flue gas 30 is large, the moisture in the flue gas is condensed by the contact with the coolant and thus the amount of the coolant increases. Thus, an excessive amount of wastewater is discharged from the wastewater discharge line 12B.

Next, the flue gas 30 squeezed into the $CO_2$ absorption tower 1 is brought into counter-contact with an absorbing liquid of a predetermined concentration supplied from the liquid dispersers 7 in the lower packed bed 2. $CO_2$ in the $CO_2$ flue gas 30 is absorbed and removed by the absorbing liquid and a decarbonated flue gas 31 flows to the upper packed bed 3. The absorbing liquid supplied to the $CO_2$ absorption tower 1 absorbs $CO_2$ and the temperature of the absorbing liquid usually rises to be higher than temperature in the absorbing liquid inlet 6 because of reaction heat due to the absorption. The absorbing liquid is sent to the heat exchanger 14 by the absorbing liquid discharge pump 13 for an absorbing liquid in which $CO_2$ is absorbed, heated and led to the absorbing liquid regeneration tower 15. It is possible to perform temperature adjustment for the regenerated absorbing liquid using the heat exchanger 14 or the cooler 27 provided between the heat exchanger 14 and the absorbing liquid inlet 6 as required.

In the absorbing liquid regeneration tower 15, the absorbing liquid is regenerated in the lower packed bed 17 according to heating by the reboiler 18, cooled by the heat exchanger 14, and returned to the $CO_2$ absorption tower 1. In the upper part of the absorbing liquid regeneration tower 15, $CO_2$ separated from the absorbing liquid comes into contact with a reflux water supplied from the liquid dispersers 24 in the upper packed bed 19 and cooled by the regeneration tower reflux cooler 23. Water vapor accompanying $CO_2$ is separated from the condensed reflux water by the $CO_2$ separator 21 and led to a $CO_2$ recover process from the recovered $CO_2$ exhaust line 22.

The reflux water is partially refluxed to the absorbing liquid regeneration tower 15 by the reflux water pump 20 and partially supplied to the regeneration tower reflux-water inlet 28 of the $CO_2$ absorption tower 1 through the regeneration tower reflux-water supply line 25. Since a small quantity of absorbing liquid is contained in this regenerated reflux water, the absorbing liquid comes into contact with an flue gas in the upper packed bed 3 of the $CO_2$ absorption tower 1 and contributes to recovery of a small quantity of absorbent contained in the decarbonated flue gas 31.

REFERENCE SIGNS LIST

1: $CO_2$ absorption tower
15: absorbing liquid regeneration tower

The invention claimed is:

1. An absorbing liquid which absorbs $CO_2$ or $H_2S$ or both contained in a gas, the absorbing liquid comprising:
   1) at least one tertiary-monoamine main agent selected from the group consisting of N-methyldiethanolamine, N-ethyldiethanolamine, N-butyldiethanolamine, 4-dimethylamino-1-butanol, 2-dimethylaminoethanol, 2-diethylaminoethanol, 2-di-n-butylaminoethanol, N-ethyl-N-methylethanolamine, 3-dimethylamino-1-propanol, and 2-dimethylamino-2-methyl-1-propanol;
   2) at least one secondary-diamine first additive selected from the group consisting of piperazine, 2-methylpiperazine, 2,3-dimethylpiperazine, 2,5-dimethylpiperazine, N,N'-dimethylethanediamine, N,N'-dimethylpropanediamine, N,N'-diethylethylenediamine, N,N'-diethylpropanediamine, N,N'-diisopropylethylenediamine, and N,N'-ditertiarybutylethanediamine; and
   3) at least one secondary-monoamine secondary additive selected from the group consisting of 2-ethylaminoethanol, 2-n-propylaminoethanol, 2-n-butylaminoethanol, 2-n-pentylaminoethanol, 2-isopropylaminoethanol, 2-sec-butylaminoethanol, and 2-isobutylaminoethanol;
   wherein a concentration of the secondary-diamine is within a range of 0.05 to 0.5 in terms of an additive concentration index represented by Expression (I) in a case of measuring the acid dissociation index at 20° C. using water as a solvent:

Additive concentration index=[secondary-diamine acid dissociation index (pKa)/tertiary-monoamine acid dissociation index (pKa)]index ratio×[secondary-diamine molar concentration (mol/L)/tertiary-monoamine molar concentration (mol/L)]molar ratio; and    (I)

wherein the weight ratio of the secondary monoamine is within a range of 0.05 to 0.55 with respect to the total sum of the tertiary monoamine and the secondary diamine.

2. The absorbing liquid according to claim 1, wherein a total sum of the tertiary monoamine, the secondary diamine and the secondary monoamine is 10% to 70% by weight with respect to the total absorbing liquid.

* * * * *